(12) United States Patent
Martin et al.

(10) Patent No.: US 7,469,483 B2
(45) Date of Patent: Dec. 30, 2008

(54) PRECISION GEOMETRIC DEVICE

(75) Inventors: Roger Neil Martin, Conover, NC (US); Dennis Hefner, Newton, NC (US)

(73) Assignee: X Marks the Spot, LLC, Newton, NC (US)

( * ) Notice: Subject to any disclaimer, the term of this patent is extended or adjusted under 35 U.S.C. 154(b) by 0 days.

(21) Appl. No.: 11/558,865

(22) Filed: Nov. 10, 2006

(65) Prior Publication Data
US 2007/0084073 A1    Apr. 19, 2007

Related U.S. Application Data

(63) Continuation-in-part of application No. 10/842,785, filed on May 12, 2005, now Pat. No. 7,162,808.

(51) Int. Cl.
*G01D 21/00* (2006.01)
(52) U.S. Cl. .......................................... 33/520; 33/562
(58) Field of Classification Search .................. 33/1 B, 33/21.3, 27.01, 27.02, 27.03, 286, 392, 494, 33/516, 520, 529, 562, 563, 458, 644, 679.1, 33/474, 476
See application file for complete search history.

(56) References Cited

U.S. PATENT DOCUMENTS

| | | | | |
|---|---|---|---|---|
| 824,299 A * | 6/1906 | Huey | ......................... | 33/27.03 |
| 2,166,650 A * | 7/1939 | Townsend | ..................... | 33/520 |
| 2,624,117 A * | 1/1953 | Paci | .......................... | 33/27.03 |
| 2,857,674 A * | 10/1958 | Feldhake | .................... | 33/27.03 |
| 5,125,161 A * | 6/1992 | Guthrie | ..................... | 33/27.03 |
| 6,467,179 B1 * | 10/2002 | Wolf | ............................ | 33/474 |
| 7,162,808 B2 * | 1/2007 | Martin | ........................ | 33/520 |
| 2004/0154175 A1 * | 8/2004 | Shapiro | ....................... | 33/458 |
| 2006/0130348 A1 * | 6/2006 | Lyman, Jr. | .................. | 33/520 |

* cited by examiner

*Primary Examiner*—G. Bradley Bennett
(74) *Attorney, Agent, or Firm*—Monty Simmons; Simmons Patents (57) ABSTRACT

The invention is directed to a single or multiple piece precision geometric device for performing a variety of geometric functions such as locating the precise center of circular member and projecting the determined center to a distant surface, performing squaring functions (inside corners and outside corners), drawing numerous types of polygons, constructing perfect 45 degree angles, right triangles, squares of various sizes, perfectly formed rhombuses and perfectly symmetric isosceles triangles.

The device may be in the shape of a cross with arms that extend outwardly from a center hole. Such arms may be foldable and/or removable to allow the geometric device to be better configured for a particular task.

20 Claims, 11 Drawing Sheets

PRECISION GEOMETRIC DEVICE

CLAIM TO PRIORITY

This application is a continuation in part of application Ser. No. 10/842,785, filed May 12, 2005 now U.S. Pat. No. 7,162,808, the entire contents of which are incorporated herein by reference.

FIELD OF THE INVENTION

The present technology relates to a single piece precision geometric device for performing a variety of geometric functions and offers nearly endless options for exploring the intricacies of the world of geometry. Such functions include locating the precise center of circular member, such as a pipe, and projecting the determined center to a distant surface if desired. Still other functions include performing squaring functions on objects being constructed (inside corners and outside corners), drawing numerous types of polygons, constructing perfect 45 degree angles, right triangles, squares of various sizes, perfectly formed rhombuses and perfectly symmetric isosceles triangles. The invention is useful in the both the professional construction industry as well as academia.

BACKGROUND OF THE INVENTION

When one asks questions about size, shape, or position, one is asking a question that requires knowledge in geometry to answer. Geometric knowledge can often be used to clarify relationships and can make abstractions more easily understood. As students learn and develop geometric ideas, their knowledge progresses through a hierarchy of levels, from the simple to the more complex. To assist students in learning to recognize shapes and how to analyze relevant geometric properties of such shapes and the relationships between such shapes, several prior art tools are often employed. For example, a student exploring the field of geometry may be asked to use tools such as a compass, a protractor, ruler, and ready made forms for shapes such as triangles, circles, squares.

While such tools work well for their intended purposes, one drawback with such tools is that the student must transport and keep track of a multiple piece geometry kit. Additionally, using "ready made" forms to make shapes (e.g. triangles, squares, etc.) detracts from the learning process. For example, when a student uses a form to make a triangle, relatively little knowledge as to how a right triangle is formed is required (like tracing a picture instead of drawing a picture). What is needed is address such drawbacks is a single tool that can perform most or all of the functions performed by a compass, a protractor, a ruler, and ready made forms while requiring the student to more fully understand how a geometric shape is formed.

Of a more practical nature, adequate knowledge of geometric relationships provides one with insights that are useful in everyday situations. Knowledge of geometry is helpful in the sciences, the arts, and in performing practical tasks, such as construction tasks. Eventually, students leave academia and start their careers and purchase homes. Many such former students, while not professional contractors, will often find it rewarding to undertake home projects. Such former students will maintain a tool box comprising wrenches, sockets, and screw drivers, and while one might find a square and tape measure, what will be sadly lacking in most tool boxes are geometric tools. What is needed is a single piece geometric device for performing a variety of geometric functions that students learn to use while in academia and continue to find useful later in life. Ideally, one embodiment of such a tool would be configured to fit within a typical tool box.

Additionally, such a geometric device should be equally useful to the professional contractor to solve geometric problems. For example, geometric problems are often encountered when performing tasks associated with plumbing a house. Consider the problem where a plumbing pipe emerges from a hole in the ceiling and must extend downwardly therefrom through a space (the height of the room) and then pass through a corresponding hole in the floor beneath. It is desirable that the hole in the floor be the same size as the hole in the ceiling and directly beneath it. In the past this has generally been attempted by measuring the distance from adjacent walls. This is very imprecise because walls rarely plumb true and the multiple measurements inevitably result in some degree of error. So the hole in the floor ends up being considerably larger than the hole in the ceiling, and having undesirably large gaps between the hole and the pipe it is intended to accommodate.

The same problem arises, when a pipe emerges horizontally from a hole in one wall and must extend through a space (the length of the room) to pass through a corresponding hole in an adjacent wall.

What is needed is a precision geometric device for performing a variety of geometric functions offering nearly endless options for exploring the intricacies of the world of geometry while providing a practical tool for addressing geometric problems such as projecting the center of a hole to a distant surface.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a device for determining the center of a pipe, which can also precisely project that center to a distant surface.

Another general object of the present invention is to provide a device for determining the center of a pipe that may be temporarily attached to the end of a pipe during the period of measurement.

In accordance with embodiments of the present invention, an instrument is provided which can be held against the end of a pipe to precisely determine its center point. Clips can be added to instrument so that it can be temporarily attached to the end of a pipe. Spirit levels can be attached to the surface of the instrument to determine its relative horizontalness. A plumb line or laser pointer may extend from the center of the instrument so as to project that center point to a distant surface. The instrument can be made of a relatively rigid material which is yet sufficiently flexible to fit around curvature of a pipe.

It is a further object of the invention to provide the aforesaid device of a material which is rigid, but sufficiently flexible to fit around the curvature of a pipe.

Yet another objection of the invention is to provide a single piece precision geometric device for performing a variety of geometric functions that is used by students while in academia as well as persons performing construction related activities.

A still further objection of the invention is to provide a collapsible single piece precision geometric device configured that allow the arms of the device to be folded over to reduce its size.

A still further object of the invention is to provide a multiple piece precision geometric that may be configured for a particular task.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the present technology.

DETAILED DESCRIPTION OF THE DRAWINGS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Figure 1:
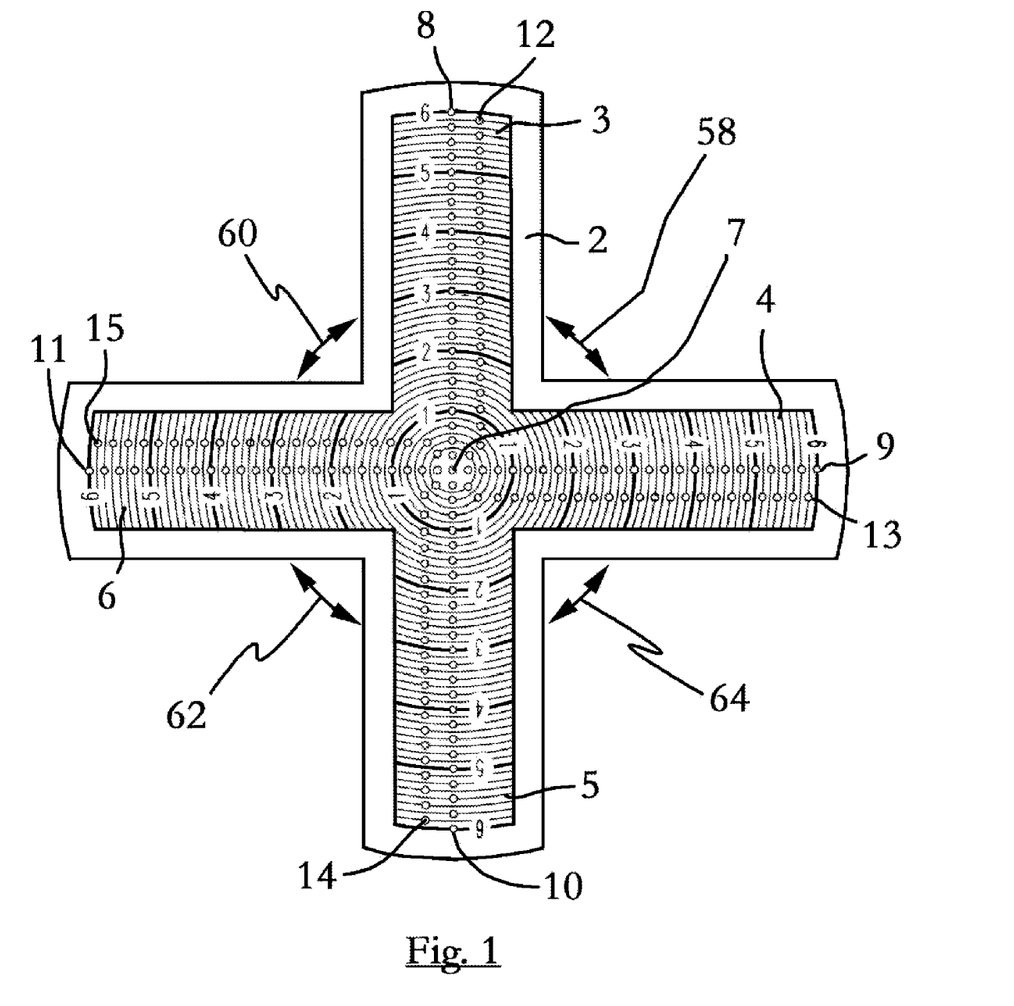
FIG. 1 is a side elevation view of one embodiment the instrument.

As illustrated in FIG. 1, the instrument, in its most basic form, comprises a cross 2, having arms 3, 4 5 and 6. At the precise center of the cross 2, is center hole 7. An aligned series of holes 8, extend outwardly from center hole 7 on arm 3. Similar aligned series of holes 9, 10 and 11, extend outwardly from center hole 7 on arms 4, 5 and 6, respectively. A series of aligned holes 12 is provided adjacent to the series of holes 8 on arm 3. Each hole of series 12 is calculated to be precisely between two adjacent holes in series 8 holes. The adjacent series of holes 13, 14 and 15 extend outwardly on arms 4, 5 and 6 adjacent to series of holes 9, 10 and 11.

It will be appreciated that this arrangement of adjacent holes provides a virtual continuum of measurement holes, without compromising the structural integrity of the instrument. More specifically, if all the holes of series 8 and 12 were aligned in a single series, they would overlap one another and would comprise an extended slot rather than a series of holes.

For the preferred embodiment, each of the holes 7 through 15 are just large enough to accommodate the point of a pencil, pen or other inscribing tool. By inserting a tack through center hole 7, or otherwise rotatably affixing it to a surface, the point of an inscribing tool can be inserted through one of the holes in the series of holes 8 through 15. The entire cross 2, can then be rotated around the center hole 7, to inscribe a circle of the dimension indicated by the specific hole (in series 8 through 15) through which the inscribing tool has been inserted.

The arms 3, 4, 5 and 6 are at right angles to one another. Arms 3 and 4 form right angle 58, arms 3 and 6 form right angle 60, arms 5 and 6 form right angle 62, and 4 and 5 form right angle 64. So the instrument cannot only determine the center of a pipe, and to draw circles, it can be use to perform squaring functions.

Figure 2:
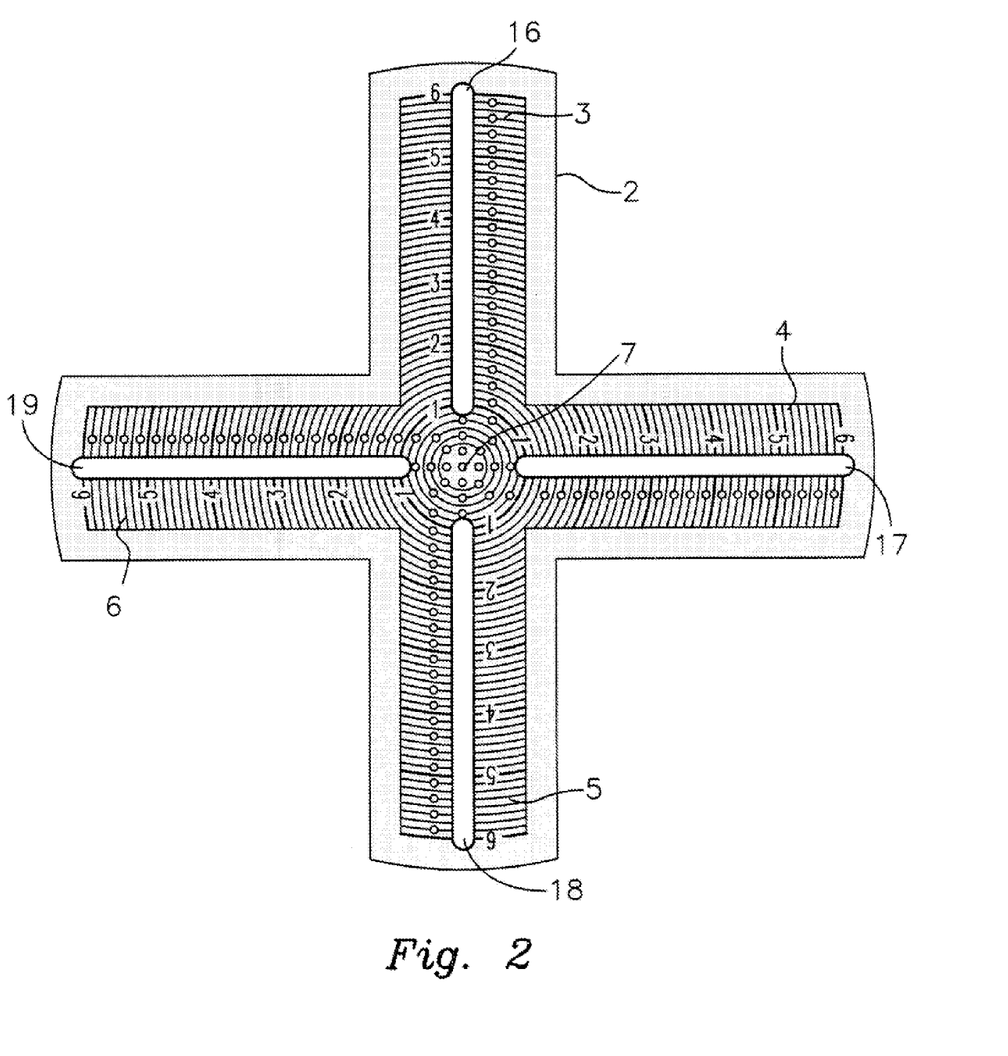
FIG. 2 is a side elevation view of an alternate form of the instrument with grooves formed therein.

In an alternate form of the instrument, shown in FIG. 2, slots 16, 17, 18 and 19 are formed respectively in arms 3, 4, 5 and 6. The slots 16, 17, 18 and 19 replace the aligned series of holes 8, 9, 10 and 11 illustrated in FIG. 1.

Figure 3A:
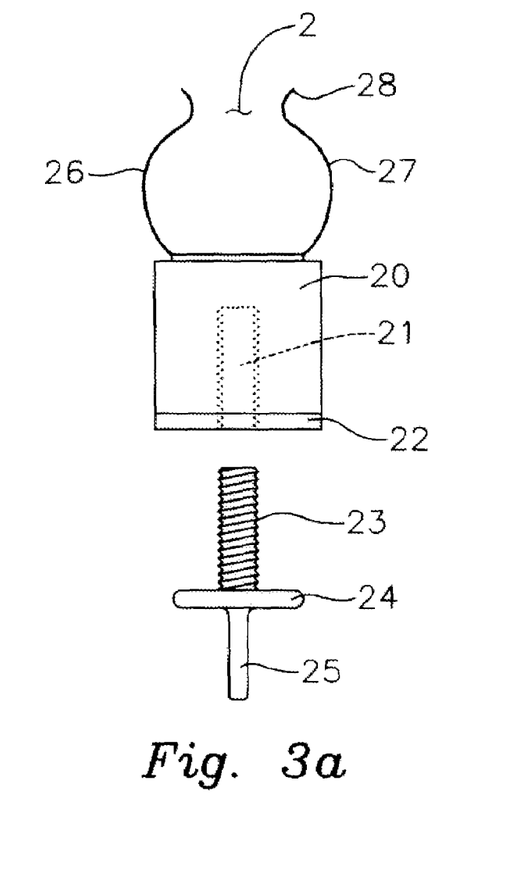
FIG. 3a is a side elevation view of a clip attachment that fits within the grooves of the instrument illustrated in FIG. 2.
Figure 3B:
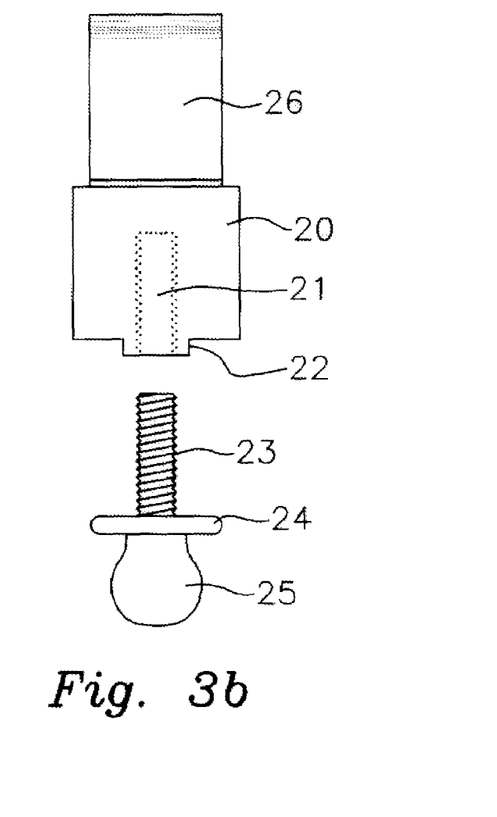
FIG. 3b is the same as FIG. 3a, but rotated 90.degree.
Figure 4:
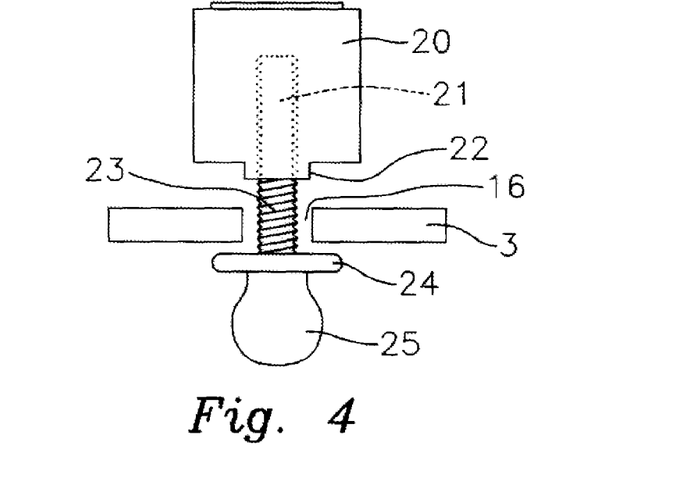
FIG. 4 illustrates the clip attachment of FIGS. 3a and 3b in relation to a groove of the instrument illustrated in FIG. 2.

FIGS. 3a, 3b and 4 illustrate a clip attachment such as may fit into the slots 16, 17, 18 and 19. It comprises a solid metal body 20, having a threaded hole 21 extending up from its bottom and through most of its center. At the bottom of body 20, there is a boss 22 which is narrower than body 20 and calculated to fit within the slots 16, 17, 18 and 19. A threaded bolt 23 is provided with dimensions, and threads to screw into the threaded hole 21, through the boss 22. The threaded bolt 23, has a bolt head 24 which is three times wider than the bolt 23. A finger grip 25, extends outwardly from the bolt head 24 and accommodates the manual manipulation of screwing the threaded bolt 23 into and out of the threaded hole 21.

Attached to the top of clip attachment body 20, is the clip 26 which is formed of rigid but flexible material such as metal spring. The clip 26 includes two opposed inwardly bowed portions 27 which are integral with the two opposed outwardly bowed portions 28 formed on the top of "s" shaped configurations. The distance between the tops of the two outwardly bowed portions 28 forms the entrance 29 to the clip 26.

An application of the clip attachment to arm 3 of the instrument 2 is illustrated in FIG. 4. The boss 22 fits down into slot 16, as the threaded bolt 23 is screwed upwardly into the threaded hole 21. As the threaded bolt 23 is screwed upwardly into the threaded hole 21, the boss 22 is drawn down into the slot 16, until it is locked into place at the desired position.

In operation, the clip attachments are positioned in the slots 16, 17, 18 and 19 so that they precisely align with the outer periphery of the pipe. The instrument 2 is then pushed against the open end of the pipe, so that the entrances 29 pass over the pipe ends and are removably attached thereto.

The instrument 2, as illustrated in FIG. 1, has to be manually held in place to determine the center of the pipe and projections therefrom. The advantage of the form illustrated in FIG. 2, is that it can be clipped on to the end of a pipe and does not to be manually held in place.

Figure 5:
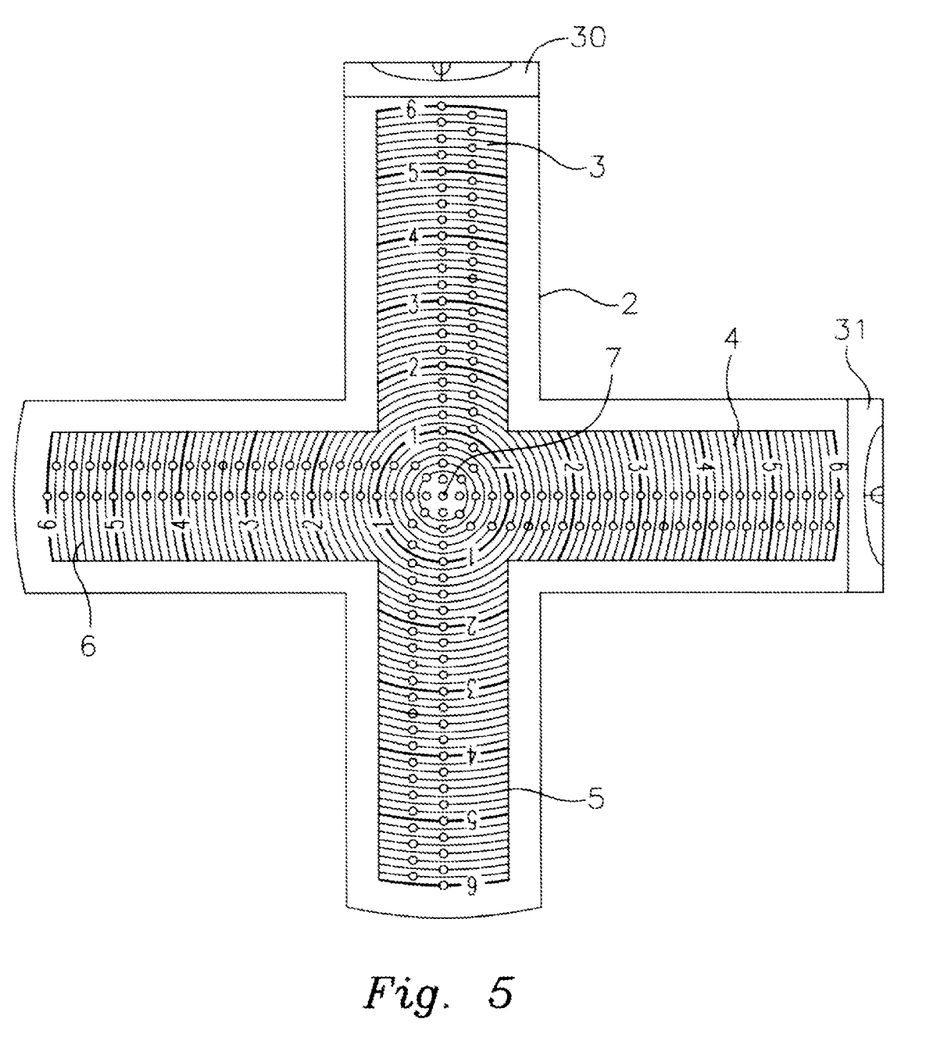
FIG. 5 is a side elevation view of an alternate form of the instrument having spirit levels mounted thereon.

A variation of the instrument is illustrated in FIG. 5. It is provided with spirit levels 30 and 31 on the arms 3 and 4. So provided, the instrument can not only determine the center of the pipe but also its relative horizontalness.

Figure 7:
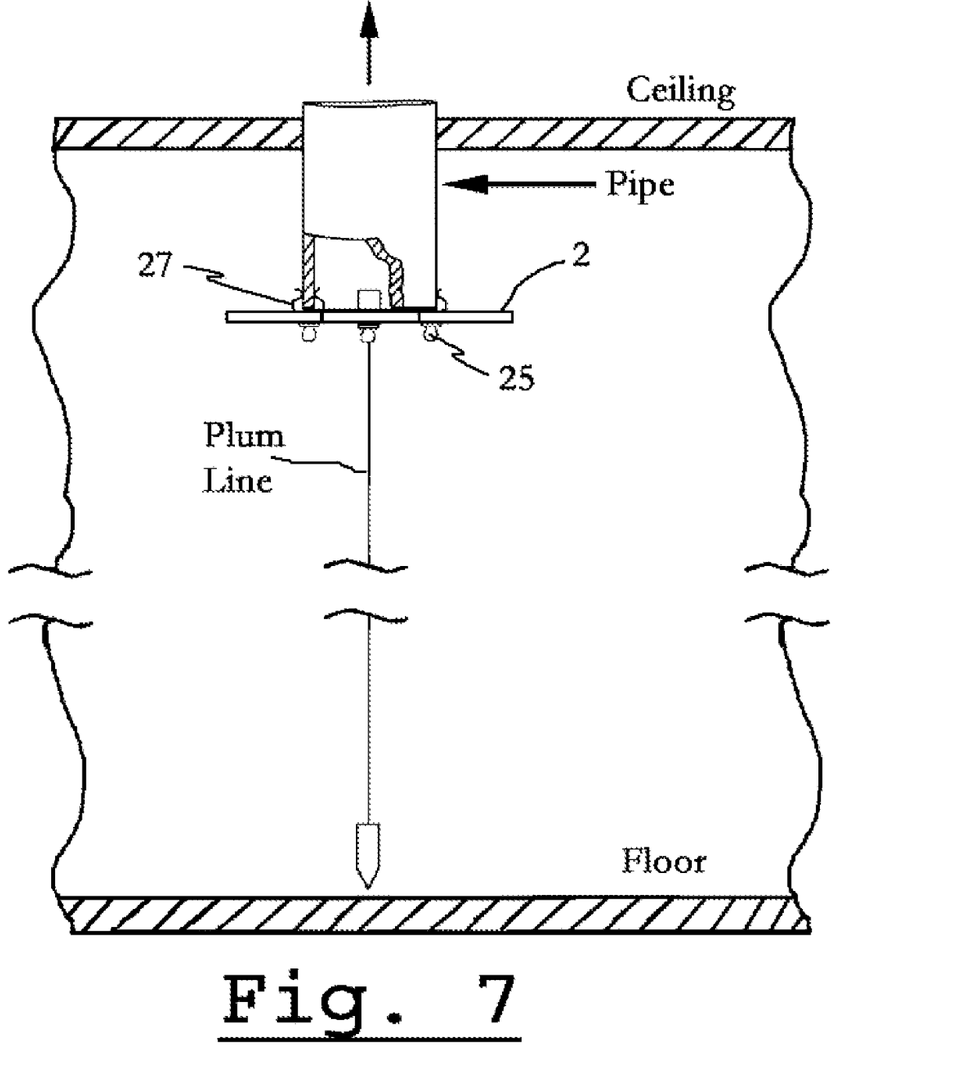
FIG. 7 is a side view of one embodiment of the invention associated with the end of a pipe extending from a ceiling with the pipe having a partial cut away section to show the interior clips and with a plumb line extending from the center of the pipe to a distant surface.

Referring now to FIG. 7, the instrument 2, when applied to a pipe extending downwardly can project its center to a lower distant surface (i.e., from ceiling to the floor beneath) by means of a plumb line hung from center hole 7. This is a simple and inexpensive expedient, but applicable only to vertically downward projections.

Figure 6:
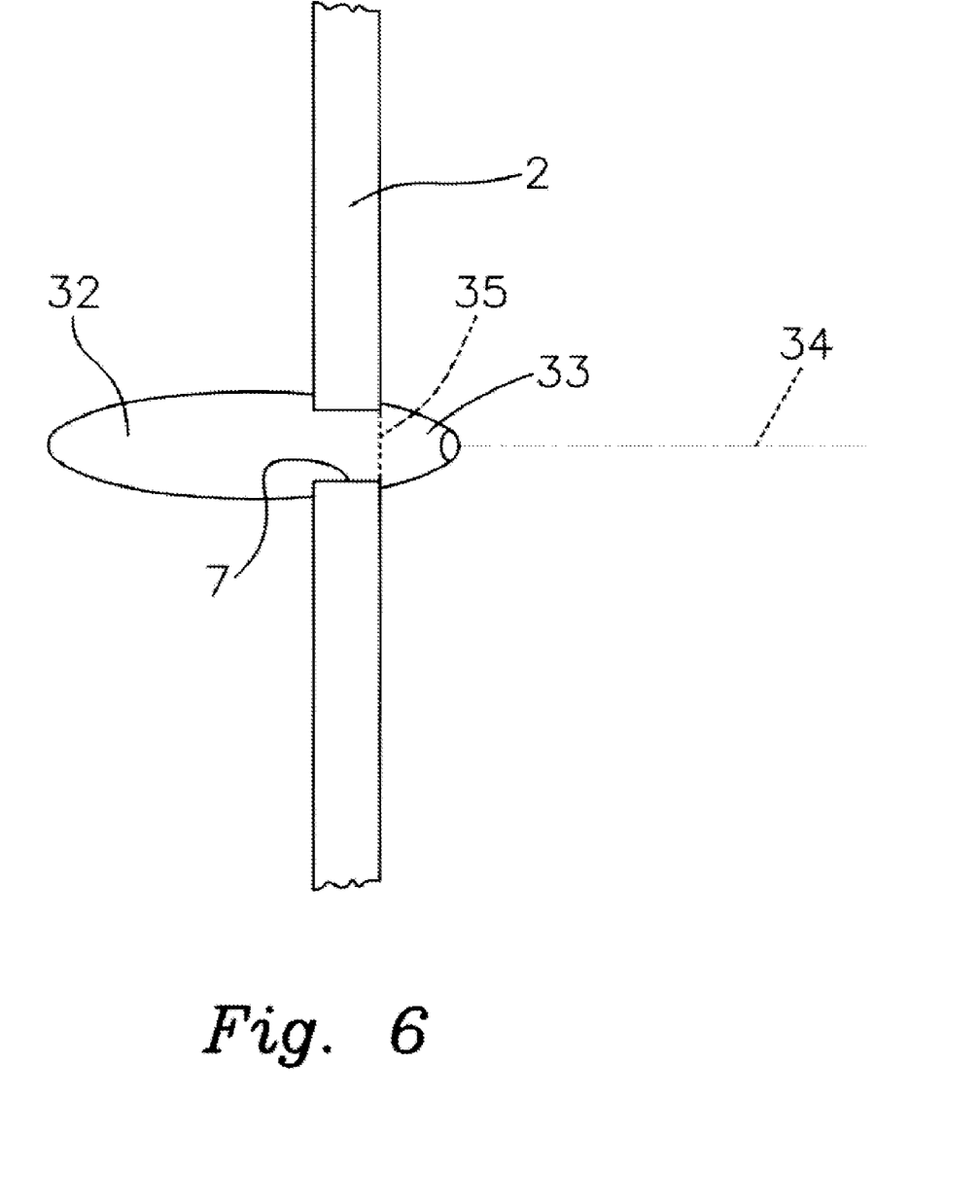
FIG. 6 is a cross sectional view illustrating an alternate form of the instrument, having a laser pointer mounted in the center thereof.

FIG. 6 illustrates a variant form of the instrument that provides a means for projecting the center of a pipe horizontally to a distant surface. The instrument 2 is provided at its center hole 7 with a laser pointer comprised of a laser pointer body 32 and laser pointer head 33. The laser pointer body 32 is attached to laser pointer head 33 at joint 35 in such a way as to secure it in a horizontally stable position within and relative to the center hole 7. In this position the laser pointer can project a beam 34 to an adjacent horizontal surface, to precisely identify the center of a pipe on such a distant horizontal surface.

The instrument 2 as described above is made of very rigid material such as metal plate, or clear plastic plate about ⅛ inch thick for the preferred embodiment. However, in one variation of the invention (not illustrated in the drawings), the instrument 2 is made of a relatively rigid material which is yet sufficiently flexible to fit around the curvature of a pipe such as the abrasive resistant material used in pipe wraps. Such materials are known by those skilled in the art and a detail description thereof is not necessary. The instrument in this form can be applied to the side of a pipe to identify the center and periphery of a nipple; that is a smaller pipe extending from the side of the pipe.

Figure 8:
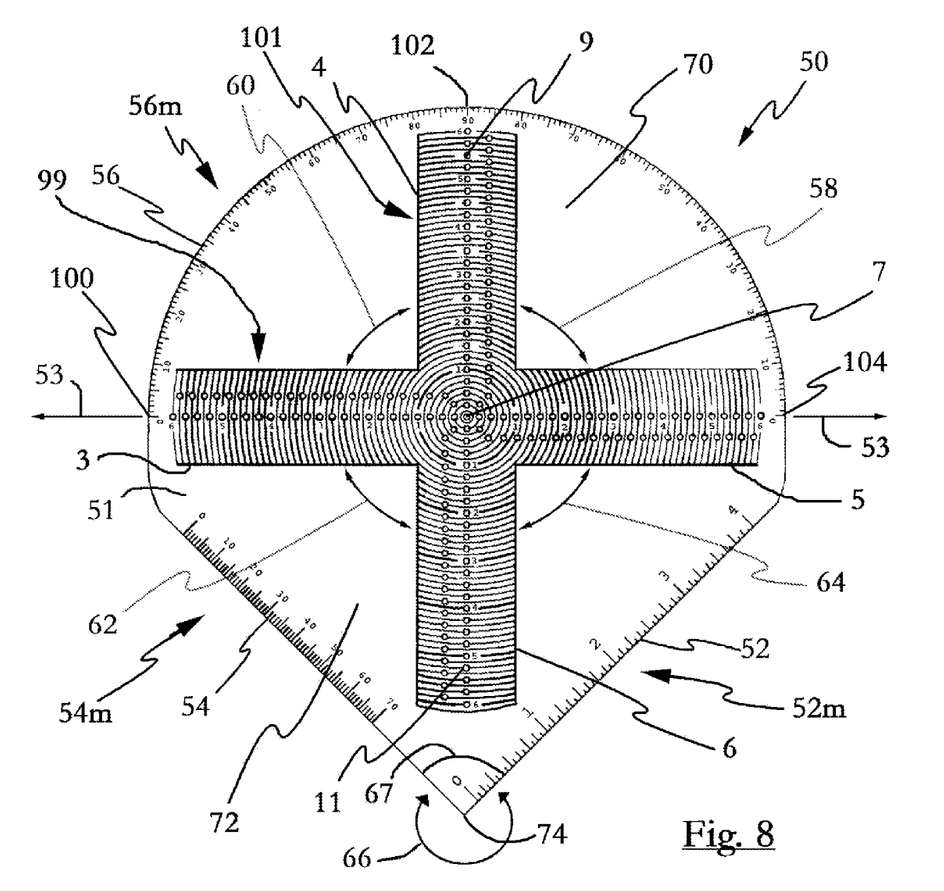
FIG. 8 is a side elevation view of an alternative form of the instrument comprising a integral protractor, English system measure, metric system measure, and an inside corner squaring feature.

Referring now to FIG. 8, yet another alternative embodiment of the invention is a geometric device (50). FIG. 8 depicts an outline of the four armed device of FIG. 1 imprinted on a transparent medium to form body (51). It should be appreciated that non-transparent mediums may be used. The intersection of arm (4) with arm (5) forms right angle (58), arm (3) and arm (4) form right angle (60), arm (3) and arm (6) form right angle (62), while arm (6) and arm (5) form right angle (64).

For the presently preferred embodiment, body (51) is formed using a transparent medium and has a substantially flat profile about ⅛" thick. The body comprises an upper section (70) and a lower section (72). A horizontal reference line (53) is defined where the two sections meet. A curved edge (56) is defined by said upper section (70). The curved edge (56) starts on reference line (53) at the far left side (100) of the body and extends along an arced path to an apex point (102) and then continues along an arced path back to the horizontal reference line (53) at the far right side (104) of said body thereby forming a semi-circular section. It should be appreciated that the semi-circular section and the upper section are the same section.

The body (51) further comprises a lower section (72) that defines a first straight edge (54) and a second straight edge (52) that start at a common vertex point (74) that is in vertical alignment with said apex point (102). The first straight edge (54) and the second straight edge (52) extend outwardly at a right angle (67) from each other and terminate at opposite ends of horizontal reference line (53) thereby forming an inverted right triangle section. It should be appreciated that the lower section and the right triangle section are the same section.

The body (51) further defines a center hole (7) positioned along horizontal reference line (53) half way between the far left side (100) and the far right side (104) so that the center hole (7), vertex point (74), and the apex point (102) are in vertical alignment.

For one embodiment, a first measurement scale (56m) runs along curved edge (56). First measurement scale (56m) starts at horizontal reference line (53) at the far left side (100) and terminates at the horizontal reference line (53) at said far right side (104). While the scale depicted in FIG. 8 starts at zero and increases to 90 on both sides of the scale, it should be appreciated that any type of scale may be used. For example, the scale may continue to increase from 90 at the apex to 180 at the reference line (53) as is common for protractors. Similarly, a dual scale may run along curved edge (56) without departing from the scope and spirit of the invention. For the preferred embodiment, the first measurement scale is in units of degrees although any systems of measure and units may be used. Additionally, first measurement scale (56m) may only run a portion of curved edge (56) without departing from the scope and spirit of the invention.

A second measurement scale (99) runs along said horizontal reference line (53). As before, any system of measurement and units may be used for this scale. Similarly a fourth measurement scale (54m) runs along first straight edge (54) and a fifth measurement scale (52m) runs along second straight edge (52). For the preferred embodiment, the fourth measurement scale (54m) conforms to a first system of measurement (e.g. metric system) while the fifth measurement scale (52m) conforms to a second unit of measurement (e.g. English system). Alternatively, the first measure and second measuring scale may use the same system of measurement but with different resolutions. Other measurement systems may also be used without departing from the scope of the invention.

Body (51) further defines a first plurality of holes (9) that extend outwardly from center hole (7) toward and in alignment with the apex (102). Body (51) further defines a second plurality of holes (11) extending outwardly from center hole (7) toward and in alignment with the vertex point (74). The first plurality of holes (9) and said second plurality of holes (11) define a third measurement scale (101). For the preferred embodiment, the second and third measurement scales are in the same units to simplify the task of determining the center of a circle.

As was noted above, body (51) may comprise a cross imprinted on a surface of body (51), wherein said cross has the same general foot print as instrument (2) described earlier. Such cross was described as comprising four arms (3, 4, 5, 6) projecting outwardly from the center hole (7) so that any two adjacent arms define a right angle. Additionally, arm (4) and arm (6) are in vertical alignment with the apex point (102) and said vertex point (74). As before, a series of aligned holes may be provided adjacent to the series of holes (9) and (11). Each adjacent hole in such series is calculated to be precisely between two holes in series (9) or (11). Similarly, a horizontal series of holes in horizontal alignment with horizontal reference line (53) is provided.

Figure 9:
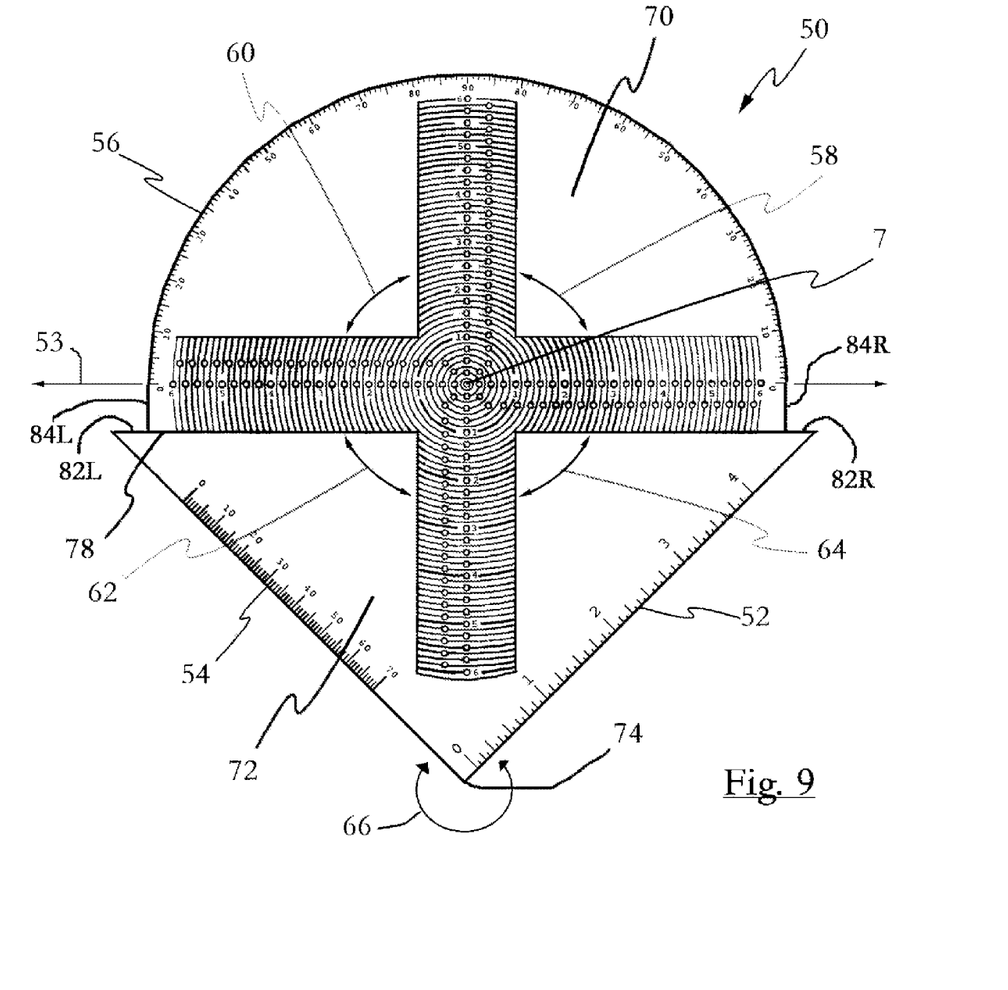
FIG. 9 presents an alternative embodiment of the invention depicted in FIG. 8 comprising extensions that form right angles with a side of the device.

FIG. 9 presents an alternative embodiment of the invention depicted in FIG. 8 as the geometric device (50) depicted in FIG. 9 comprises horizontal extensions (82L and 82R) in horizontal alignment with horizontal line (78). Horizontal extension (82L) extends beyond curved edge (56) so that side section (84L) and horizontal extension (82L) form a right angle. Similarly, horizontal extension (82R) extends beyond curved edge (56) so that side section (84R) and horizontal extension (82R) form a right angle.

Figure 9B:
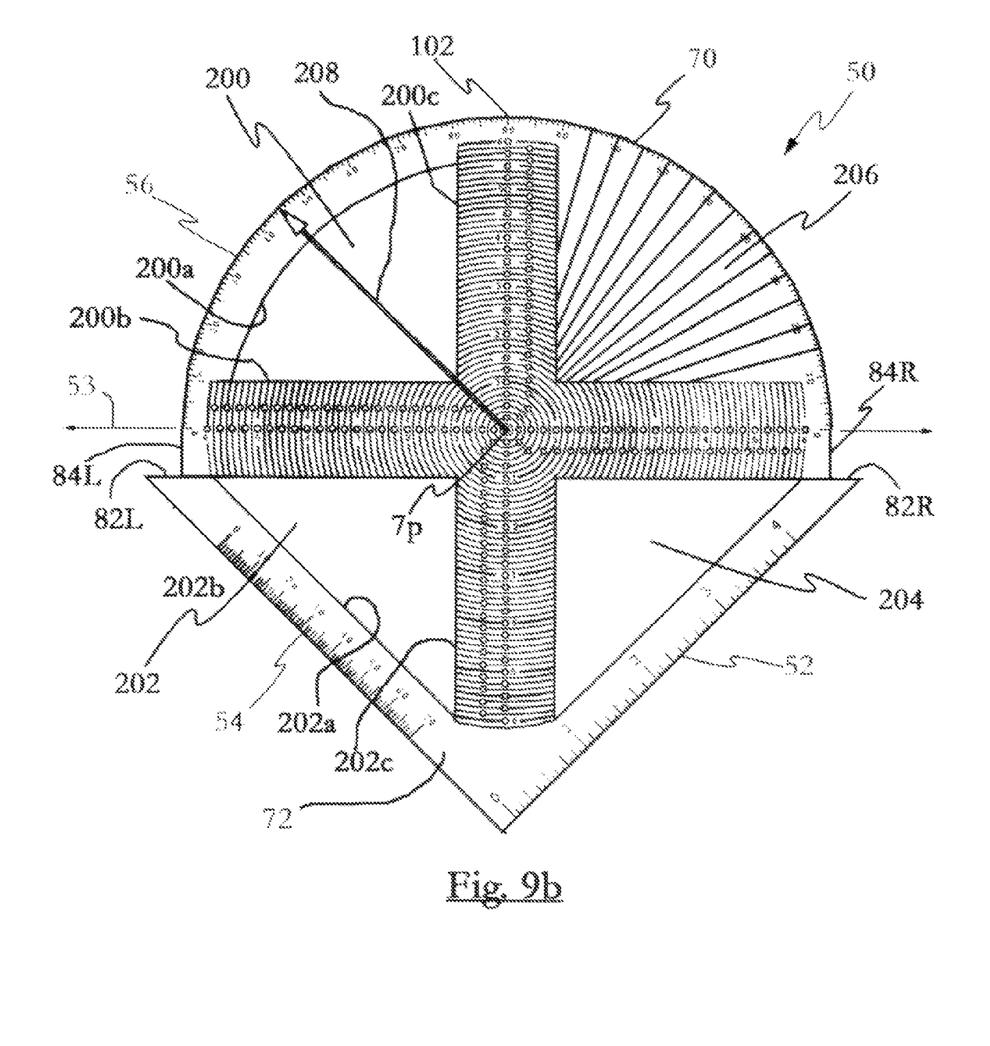
FIG. 9b presents an alternative embodiment of the invention depicted in FIG. 8 comprising quadrant voids, a lined quadrant, and a center hole accessory.

Attention is now directed to FIG. 9b which depicts a side elevation view of the FIG. 9 device comprising quadrant voids. As depicted in FIG. 9b, device 50 further comprises quadrant void (200), (202), (204) and as well as lined quadrant (206). Quadrant void (200) is the area between curved edge (200a), straight edge (200b) and straight edge (200c). It should be appreciated that quadrant void (200) is void of material thereby providing a pie shaped form. Similarly, quadrant void (202) is the area between straight edges (202a), (202b) and (202c). Quadrant void (204) is defined in a similar manner. It should be appreciated by one of ordinary skill in the art that for the embodiment of the invention depicted in FIG. 9b, quadrant void (202) and (204) form perfect equilateral triangles.

Lined quadrant (206) comprises is a solid section (not a void) comprising a plurality of lines imprinted on its surface. For the preferred embodiment, such lines are referenced from center hole (7) and extend out to a predefined point along curved edge (56). It should be noted, however, that such lines are not imprinted over the cross imprint defined earlier. Restated, such lines while referenced to center hole (7) are only imprinted on lined quadrant (206) and not on the cross section. Such lines facilitate easier measurement of angles.

The embodiment of device (50) depicted in FIG. 9b may further comprise center hole accessories configured for being associated with center hole (7) and performing a particular task. On such center hole (7) accessory is pointer (208). Pivot point (7b) of pointer (208) is movably associated with center hole (7) so that pointer (208) may be moved in a clockwise or counter clockwise direction about center hole (7). The distal end of pointer (208) relative to pivot point (7b) has the shape of a pointer.

Device (50) may further comprise any number of hole accessories that may be used to perform a number of tasks. One such hole accessory is a light source associated with a hole interface. For the preferred embodiment, the light source is a laser and the hole interface is a pin configured for being removably associated with a hole(s) in device (50). Similarly, alternative embodiments of device (50) may define holes at any location desired within device (50). For such a configuration, an almost endless number of geometric figures can be projected on a distant surface.

Figure 10:
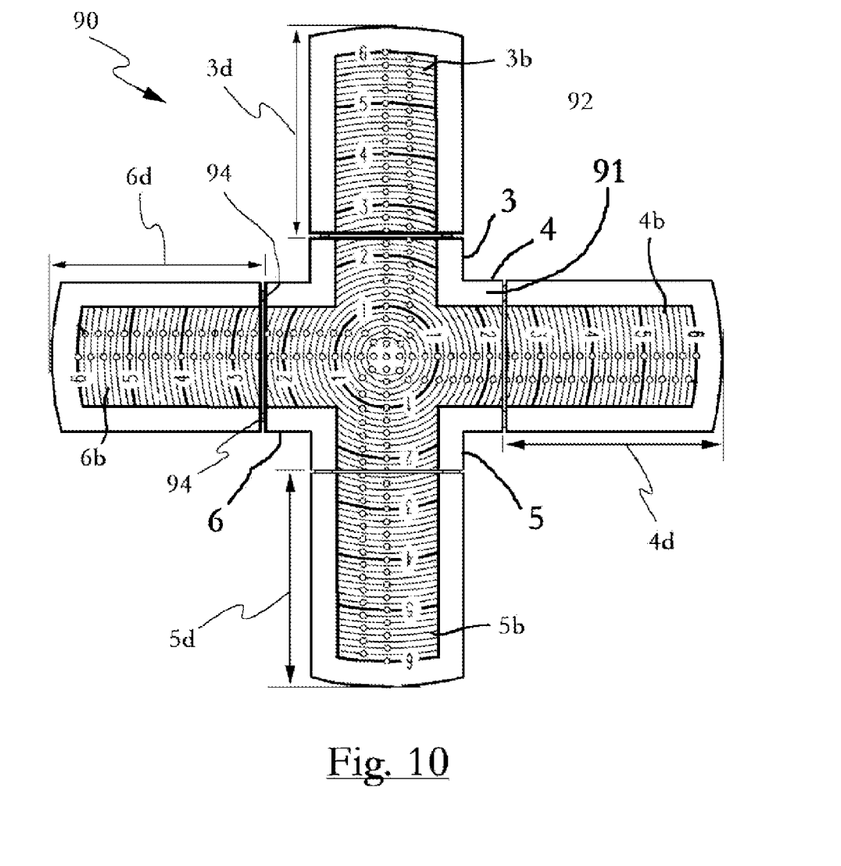
FIG. 10 presents an alternative embodiment of the device depicted in FIG. 1 comprising foldable arms.

Attention is now directed to FIG. 10 which presents an alternative embodiment of the invention shown in FIG. 1. The device (90) comprises a cross shaped body having a substantially flat profile and defining a center hub (91) comprising four arms (3, 4, 5, 6) projecting outwardly from a center hole (7). As before, any two adjacent arms (3, 4, 5, 6) define a right angle. A least one arm-extension is movably associated with each center hub arm. As shown in FIG. 10, four collapsible arms, 3b, 4b, 5b, and 6b are movably associated with center hub (91).

Figure 11:
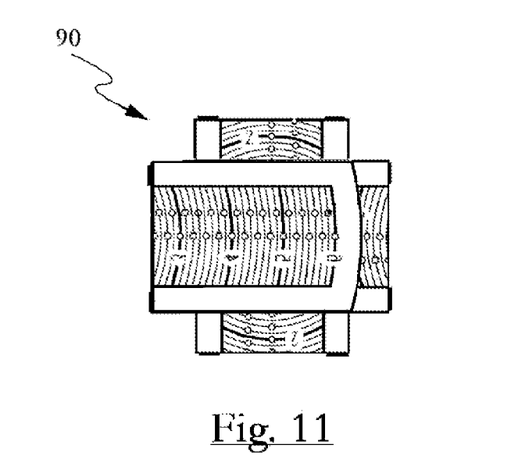
FIG. 11 presents a side elevation view of the FIG. 10 device with the foldable arms folded together.

Each arm and arm extension is separated by a small gap. Preferably, the parts are manufactured so that such gap does not substantially affect the precision of device (90). For the preferred embodiment, the center hub arms and arm-extensions are mechanically associated to each other by resilient, flexible, metal fasteners (94) that tend to pull the arm sections together and in horizontal alignment. For such a configuration, the arm-extensions for each arm may be folded over to reduce the size of the device as shown in FIG. 11. For one configuration, fasteners (94) provide a sliding and flexing motion to provide the needed range of vertical and horizontal movement to allow the arm-extensions to fold over.

When device (90) is folded as depicted in FIG. 11, the device may be placed in a relatively small container for storage. Such a container may comprise a belt loop or clip so that the device can be associated with a user by a belt. Device (90) may also be provided with an integral or separate clip for maintaining a folded configuration during storage.

Figure 12:
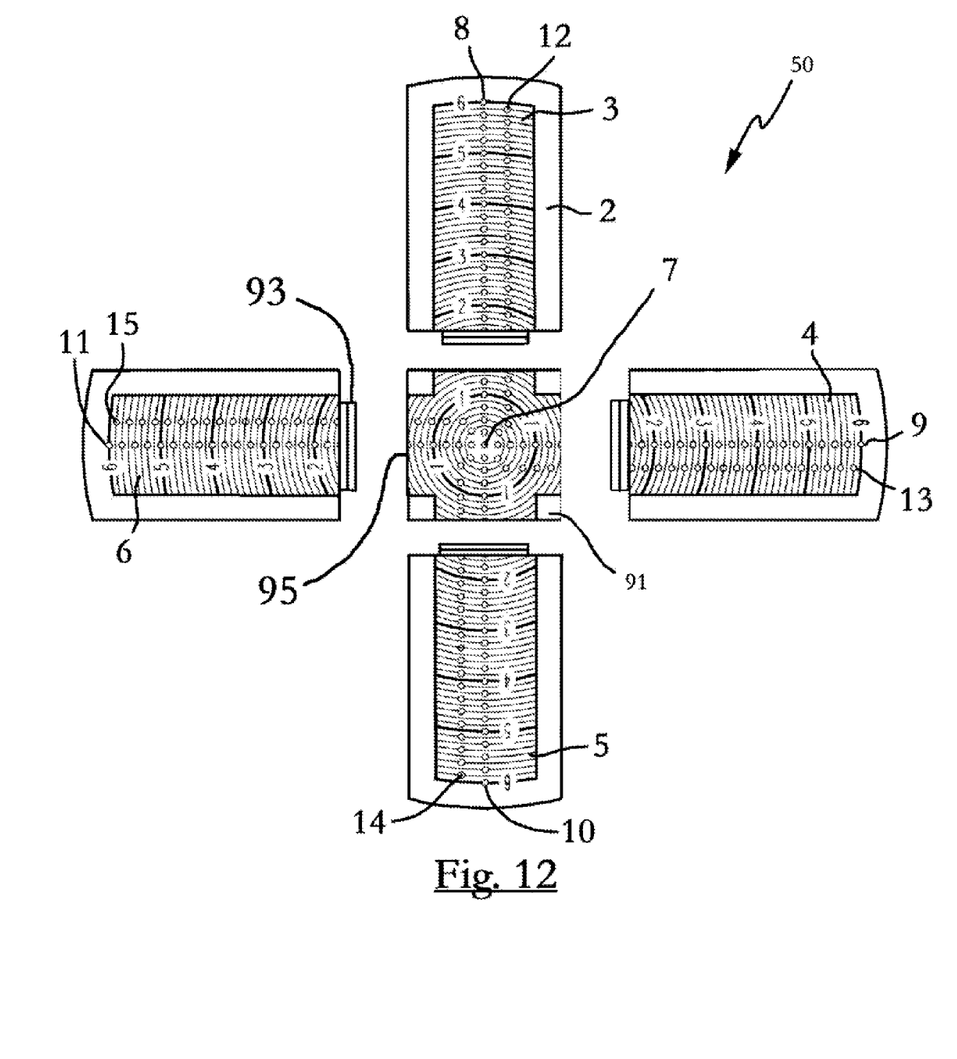
FIG. 12 presents a side elevation view of the FIG. 1 device with removable arms that allow the geometric device to be configured for a particular task.

Referring now to FIG. 12, yet another embodiment of the invention is depicted. The geometric device of FIG. 12 comprises removable arms (3, 4, 5, 6) that are configured to be movably associated with center hub (91). For this embodiment, each arm comprises an insert clip (93) that is configured to be inserted into receiver (95) of hub (91). It should be appreciated that any number of attachment technologies may be used to removably associate the removable arms with center hub (91). Additionally, some arms may be removable while other arms may be foldable as describe above while still other arms may be fixed.

For the embodiment of the invention shown in FIG. 12, it should be appreciated that the geometric device may be configured for a particular task. For example, to perform squaring functions, arms (3) and arms (6) might be removed thereby forming the well known squaring tool. Similarly, with arms (2) and (5) removed and arms (4) and (6) attached to center hub (91) in horizontal alignment, the device becomes a straight edge ruler.

It should be appreciated by one of ordinary skill in the art that the devices described above may be used to perform an almost endless number of geometric tasks allowing the student to explore the intricacies of the world of geometry. As previously noted, the devices are an ideal tool for performing squaring functions and locating the center of any circle up to the length of the arms. The geometric device can further be used to construct perfect 45 degree angles, a variety of right triangles, squares of various sizes, perfectly formed rhombuses, creating exact geometric kites and forming perfectly symmetric isosceles triangles.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A single piece precision geometric device for performing a plurality of geometric functions, said precision geometric device comprising:
    a cross shaped body having a substantially flat profile and comprising four arms projecting outwardly from a center hole so that any two adjacent arms define a right angle;
    a plurality of holes defined by each arm wherein said plurality of holes extend outwardly from said center hole;
    wherein the plurality of holes defined by any one arm are in alignment with each other; and
    wherein each hole of said plurality of holes is positioned a predefined distance from said center hole so that the precision geometric device can be used to perform a plurality of geometric functions including determining the center of a circle, constructing 45 degree angles, right triangles, squares, and rhombuses.

2. A single piece precision geometric device as in claim 1, wherein said plurality of geometric functions further includes constructing geometric kites and isosceles triangles.

3. A single piece precision geometric device as in claim 1, wherein at least one arm farther comprises a second plurality of holes that extend outwardly on said at least one arm so that said second plurality of holes are adjacent to the plurality of holes that are in alignment with the center hole.

4. A single piece precision geometric device as in claim 1, wherein each arm defines a first measurement scale for determining the distance from the center hole.

5. A single piece precision geometric device as in claim 4, wherein the edge of at least one arm further defines a second measurement scale running along said edge for performing linear distance measurements.

6. A single piece geometric device as in claim 5, wherein said first measurement scale is in English units and said second measurement scale is in metric units.

7. A single piece geometric device as in claim 1, wherein said body is constructed from a substantially transparent material.

8. A geometric device for performing a plurality of geometric functions, said geometric device comprising:
    a body having a substantially flat profile, said body comprising an upper section and a lower section thereby defining a horizontal reference line where the two sections meet;
    a curved edge defined by said upper section, said curved edge staffing at said reference line on the far left side of the body and extends along an arced path to an apex point and then continues along an arced path back to the horizontal reference line at the far right side of said body thereby forming a circular section;
    wherein said lower section defines a first straight edge and a second straight edge that start at a common vertex point that is in vertical alignment with said apex point, said first straight edge and said second straight edge extending outwardly at a right angle from each other and terminating at the horizontal reference line at opposite ends of said body thereby forming an inverted right triangle section;
    a center hole defined by said body wherein said center hole is positioned along said horizontal reference line halfway between said far left side and said far right side so that said center hole, said vertex point and said apex point are in vertical alignment;
    a first plurality of holes defined by said body wherein said first plurality of holes extend outwardly from said center hole toward and in alignment with said apex;
    a second plurality of holes defined by said body wherein said second plurality of holes extend outwardly from said center hole toward and in alignment with said vertex; and
    wherein each hole of said plurality of holes is positioned a predefined distance from said center hole so that the precision geometric device can be used to perform a plurality of geometric functions including determining the center of a circle.

9. A geometric device as in claim 8, further comprising a cross imprinted on a surface of said body, said cross comprising four arms projecting outwardly from said center hole so that any two adjacent arms define a right angle and wherein two arms are in vertical alignment with said apex point and said vertex point.

10. A geometric device as in claim 9, wherein said body further defines a third plurality of holes extending outwardly from said center hole toward said far left side and a fourth plurality of holes extending outwardly from said center hole toward said far right side.

11. A geometric device as in claim 8, further comprising:
    a first measurement scale running along said curved edge, said first measurement sale starting at said horizontal reference line at said far left side and terminating at said horizontal reference line at said far right side;
    a second measurement scale running along said horizontal reference line; and
    wherein said first plurality of holes and said second plurality of holes define a third measurement scale.

12. A geometric device as in claim 11, wherein a fourth measurement scale runs along said first straight edge and a fifth measurement scale runs along said second straight edge and wherein a pointer is movably associated with said center hole.

13. A geometric device as in claim 12,
    wherein said device further defines a lined quadrant comprising a plurality of lines imprinted on the surface of the device; and
    wherein such lines are referenced from said center hole and extend out to a predefined point along said curved edge.

14. A geometric device for performing a plurality of geometric functions, said precision geometric device comprising:
    a cross shaped body having a substantially flat profile and defining a center hub associated with four arms, said center hub defining a center hole, said four arms projecting outwardly from said center hole so that any two adjacent arms define a right angle;
    a plurality of holes defined by each arm wherein said plurality of holes extend outwardly from said center hole;
    wherein the plurality of holes defined by any one arm are in alignment with each other; and wherein each hole of said plurality of holes is positioned a predefined distance from said center hole so that the precision geometric device can be used to perform a plurality of geometric functions including determining the center of a circle.

15. A geometric device for performing a plurality of geometric functions as in claim 14, wherein at least one arm is movably associated with the center hub thereby allowing the arm to be folded.

16. A geometric device for performing a plurality of geometric functions as in claim 15, wherein said arm is movably associated with said center hub by resilient connectors that tend to maintain the arm in an unfolded position.

17. A geometric device for performing a plurality of geometric functions as in claim 16, further comprising a clip for maintaining the geometric device in the folded up position.

18. A geometric device for performing a plurality of geometric functions as in claim 17, wherein said clip is further configured to be associated with the belt of a user.

19. A geometric device for performing a plurality of geometric functions as in claim 14, wherein at least one arm is removably associated with said center hub.

20. A geometric device for performing a plurality of geometric functions as in claim 14, further comprising at least one center hole accessory.

* * * * *